(12) United States Patent
Bruck et al.

(10) Patent No.: US 9,694,423 B2
(45) Date of Patent: Jul. 4, 2017

(54) LASER ADDITIVE MANUFACTURING USING FILLER MATERIAL SUSPENDED IN A LIQUID CARRIER

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 62 days.

(21) Appl. No.: 14/682,332

(22) Filed: Apr. 9, 2015

(65) Prior Publication Data

US 2016/0298220 A1 Oct. 13, 2016

(51) Int. Cl.
| | |
|---|---|
| *B05D 3/00* | (2006.01) |
| *C08J 7/18* | (2006.01) |
| *G21H 5/00* | (2006.01) |
| *B22F 3/105* | (2006.01) |
| *C23C 24/10* | (2006.01) |

(52) U.S. Cl.
CPC ............ *B22F 3/1055* (2013.01); *C23C 24/10* (2013.01); *C23C 24/103* (2013.01); *Y02P 10/295* (2015.11)

(58) Field of Classification Search
CPC ..... C09D 11/52; C23C 24/103; C23C 24/106; C23C 24/10
See application file for complete search history.

(56) References Cited

U.S. PATENT DOCUMENTS

| | | | |
|---|---|---|---|
| 2006/0269687 A1* | 11/2006 | Lineton | G03F 1/20 427/532 |
| 2011/0067796 A1 | 3/2011 | Belhadjhamida et al. | |
| 2012/0315497 A1 | 12/2012 | Becker et al. | |
| 2012/0318399 A1 | 12/2012 | Yao et al. | |
| 2014/0227123 A1 | 8/2014 | Gunster et al. | |

* cited by examiner

*Primary Examiner* — Michael Wieczorek

(57) ABSTRACT

A method including: flowing a liquid carrier medium (12) having a supply (14) of metal particles (16) across a surface (20) of a substrate (10); directing an energy beam (30) through the flowing liquid carrier medium toward the surface; and heating at least some of the metal particles in the liquid carrier medium with the energy beam to form a metallic deposit (32) that is bonded to the substrate surface and that is covered by the liquid carrier medium.

20 Claims, 3 Drawing Sheets

LASER ADDITIVE MANUFACTURING USING FILLER MATERIAL SUSPENDED IN A LIQUID CARRIER

FIELD OF THE INVENTION

The invention relates to an additive manufacturing process that directs an energy beam through a liquid carrier medium to heat suspended metal particles and form a deposit on a substrate.

BACKGROUND OF THE INVENTION

Laser additive manufacturing by selective laser sintering (SLS) or selective laser melting (SLM) of metal particles using commercial systems usually involves several steps, including: spreading a coating of a thin layer of metal powder over a metal surface to be built on; laser processing a preprogrammed pattern of a slice of the part to sinter or melt the powder, thereby adhering the slice to the underlying substrate; lowering of the part in the bed of metal powder; coating of another thin layer of metal powder over the previously processed surface; and repeating the laser processing, lowering, and coating steps until the component is additively built.

This process is typically conducted in a chamber filled with dry argon to protect the laser sinter/melt process from oxidation and to protect the powder from hydration. The lowering step is conducted using a vertical drive. The spreading step is conducted using a horizontal wiper mechanism. During both of these mechanical steps the laser processing halts.

A major limitation of this technology is a slow process speed. The laser can process a given layer relatively quickly, but the laser must be deactivated when the component is being lowered as well as when the component is being coated. The coating utilizes a relatively slow mechanical wiper in all known SLS/SLM equipment. Consequently, there remains room in the art for improvement.

BRIEF DESCRIPTION OF THE DRAWINGS

The invention is explained in the following description in view of the drawings that show.

DETAILED DESCRIPTION OF THE INVENTION

The present inventors disclose herein a continuous additive manufacturing process that reduces and/or eliminates interruptions of the laser processing of known selective laser sintering and selective laser melting processes. In the innovative process disclosed herein, the metal powder is no longer intermittently applied, but is instead continuously delivered to the laser processing site via a continuous flow of a liquid carrier medium over a working surface of the substrate. The flow carries a supply of the metal particles suspended therein. The liquid carrier medium and the metal particles may form a suspension or a colloid, (a.k.a. a colloidal suspension). The laser beam is directed through the fluid carrier medium and toward a substrate. The laser beam encounters and heats the metal particles. The heated metal particles agglomerate on the surface of the substrate where a metal deposit is formed. The amount of energy is controlled such that the metal deposit may be porous and include sintered metal particles. Alternately, the laser beam may melt the metal particles to form a weld pool which solidifies into the metal deposit. The flow ensures a constant supply of metal particles and this permits uninterrupted laser processing. The platform supporting the substrate may be lowered and/or raised as necessary with relative ease since it is submerged in the liquid carrier medium as opposed to a bed of powder. This raising and/or lowering may occur during the laser processing. For example, the laser processing may continue during the lowering to form a beginning of the next metallic deposit. Unlike the prior art, parts of the component may extend above the processing plane because no mechanical wiper mechanism is involved that would cause interference with such an extension.

Figure 1:
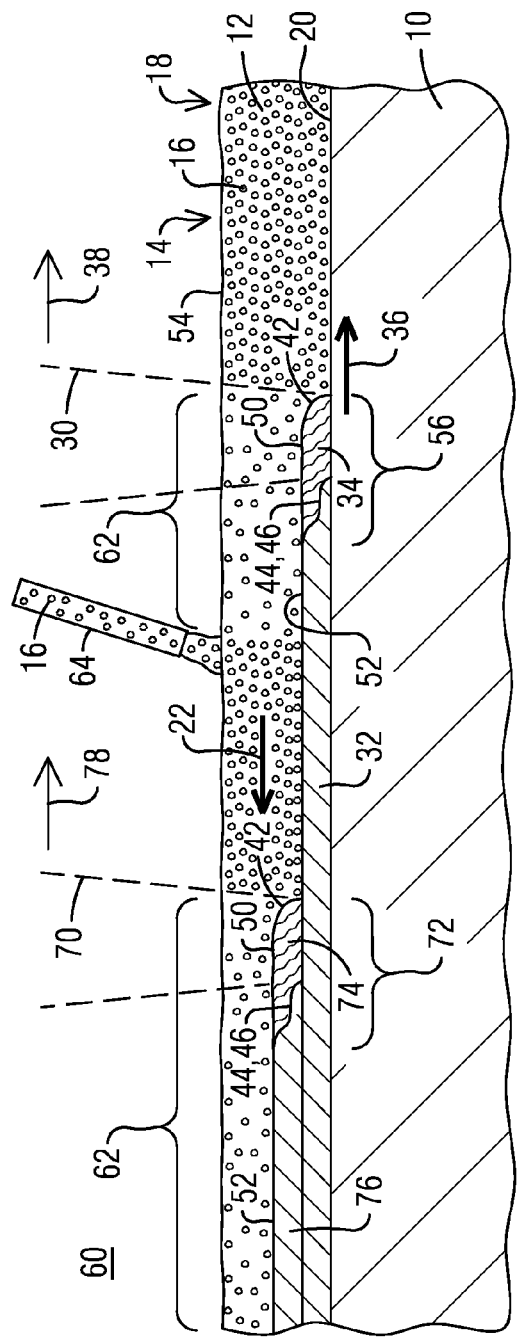
FIG. 1 is a schematic illustration of an exemplary embodiment of an additive manufacturing process.

FIG. 1 schematically illustrates an exemplary embodiment of an additive manufacturing process. A substrate 10 is submerged in a liquid carrier medium 12 carrying a supply 14 of metal particles 16. The liquid carrier medium 12 may hold the metal particles 16 such that the two form a suspension or a colloidal suspension 18. A suspension is considered to be a mixture of the liquid carrier medium 12 having suspended particles therein that are sufficiently large for sedimentation. A colloidal suspension is considered to be a mixture of the liquid carrier medium 12 having suspended particles therein that do not settle. Either a suspension or a colloidal suspension may be used. If a suspension is used, then it must be maintained to ensure the particles remain suspended, such as by agitation/mixing. The liquid carrier medium 12 flows (e.g. sheets) across a surface 20 of the substrate 10 in a flow direction 22. A first energy beam 30, for example a laser beam, is directed through the liquid carrier medium 12 toward the substrate surface 20. The first laser beam 30 encounters the metal particles 16 in the supply 14. The metal particles 16 absorb energy from the first laser beam 30, agglomerate, and form a first metal deposit 32 on the substrate surface 20.

The amount of energy delivered by the first laser beam 30 is controlled so the metal particles 16 are heated, but not melted. A resulting first metal deposit 32 has a porous, sintered structured. Alternately, the metal particles 16 may be melted to form a first melt pool 34 that solidifies into the first metal deposit 32. In the exemplary embodiment shown the first melt pool 34 traverses the substrate surface 20 in a first melt pool direction 36 from left to right. The first melt pool direction 36 naturally coincides with a first laser direction 38. The first laser beam 30 may be focused on or immediately above the substrate surface 20 so that metal particles 16 above that region are not heated as much, while those proximate the substrate surface 20 are sufficiently heated.

While the flow direction 22 and the first melt pool direction 36 shown are opposite each other, this is not a requirement. The first flow direction may remain relatively constant with respect to the substrate 10 due to the construction of the process apparatus (not shown). Alternately, the first flow direction may vary. The first melt pool 34 may move in varying directions with respect to the flow direction 22 to form the first metal deposit 32. Melt pools define a melt pool leading edge 42 and a melt pool trailing edge 44 which is, in turn, a metal deposit leading edge 46 (a.k.a. a freeze front). The flow direction 22 may be promoted by the process program itself. That is, as metal particles 16 are sintered or melted to form a deposit 32, the localized and momentary depletion in metal particle concentration in the suspension or colloidal suspension 18 may soon thereafter be rectified (re-supplied) by agitation or Brownian motion of the particulates to the depleted region.

During the heating and forming of the first metal deposit 32, a melt pool surface 50 and a metal deposit surface 52 remain below a liquid carrier medium surface 54. In some exemplary embodiments the liquid carrier medium 12 does not locally volatize in a first working region 56 immediately adjacent where the first laser beam 30 is heating the metal particles 16 and forming the first metal deposit 32. In such instances, the first melt pool 34 and the first metal deposit 32 remain fully submerged in the liquid carrier medium 12. Alternately, the liquid carrier medium 12 may locally volatize. This may result in relatively aggressive but transient perturbations in the liquid carrier medium 12 in the first working region 56 and transient exposure of the first melt pool 34 to an atmosphere 60 above the liquid carrier medium surface 54. As the first working region 56 traverses away the liquid carrier medium 12 will again settle in over the first melt pool 34 and the first metal deposit 32. The surface tension of the liquid carrier medium 12 and of the first melt pool 34 will cooperate to smooth the melt pool surface 50 as it cools and solidifies into the first metal deposit 32.

As the metal particles 16 form the first metal deposit 32 the supply 14 is depleted, leaving a depleted region 62 in the liquid carrier medium 12. In an exemplary embodiment the supply 14 may be refreshed via a source 64 of metal particles 16. There may be more than one source 64, and they may be located anywhere deemed appropriate, such as upstream of all working regions (with respect to the flow direction 22), between working regions, downstream of the working regions, and/or any combination thereof. Once the first laser beam 30 has completed its processing for the first metal deposit 32 the substrate 10 may be lowered and processing of another metal deposit begun. In an exemplary embodiment the lowering is continuous rather than incremental. That is, rather than simply programming the laser direction to process a two dimensional slice of the part (as in traditional SLS and SLM), the laser is programmed to also build in the vertical direction. A simple example of this would be building a tube of vertical axis. Rather than incremental processing of circular slices stacked one on top of another, the laser would continuously process the tube wall in a spiral fashion. In such an exemplary embodiment, the metal deposition may continue nonstop from initiation until the desired component is complete. Alternately, the laser processing may halt until the substrate 10 is lowered. This process may repeat as many times as necessary to form a component. The substrate 10 may be lowered and/or raised before, during, and/or after laser processing as desired. The laser processing and the raising and/or lowering may be sequential and/or simultaneous.

In the exemplary embodiment shown there is a second energy beam 70 such as a laser beam heating metal particles 16 in a second working region 72 and forming a second melt pool 74 and a second metal deposit 76 on top of the first metal deposit 32 which, with respect to the second metal deposit 76, is now the substrate. The second laser beam 70 is moving in a second laser beam direction 78 that may or may not coincide with the first 38 laser beam direction. The formation of the second metal deposit 76 forms another depleted region 62 in the liquid carrier medium 12 which may be refreshed if the liquid carrier medium 12 is recycled and again passed over the substrate 10. The laser beams may process simultaneously and/or sequentially, and one may produce a sintered metal deposit while the other may produce a melt pool that then forms the respective metal deposit. There may be any number of laser beams and they may sinter or melt deposit in any combination.

The liquid carrier medium 12 may be selected such that it is in a liquid state as it flows over the substrate 10 (i.e., the liquid carrier medium 12 may be a liquid below a melting temperature of the metal particles 16 and the substrate 10). It may also be selected to be transmissive to the first laser beam 30 and have a boiling temperature above a melting temperature of the metal particles 16. The boiling temperature may be sufficiently over the melting temperature of the metal particles 16 as to enable the liquid carrier medium 12 to remain liquid (i.e. not volatize) during the heating of the metal particles 16 and the formation of the metal deposit. Alternately, the liquid carrier medium 12 may be transmissive to the first laser beam 30, but may fully and/or partially volatize locally during the heating of the metal particles and/or the formation of the metal deposit. In such an embodiment the liquid carrier medium 12 would simply condense when outside the working region. Alternately, and/or in addition, the atmosphere 60 may be pressurized to increase the boiling temperature of the liquid carrier medium 12 to the level desired.

Alternately, the liquid carrier medium 12 may be less transmissive, up to and including being fully opaque to the first laser beam 30. In such an exemplary embodiment the energy beam would volatize the liquid carrier medium 12 within the working region. In this manner the liquid carrier medium 12 essentially delivers the metal particles 16 to the working region, at which time the liquid carrier medium 12 is separated from the metal particles 16 (evaporated away) via the laser beam, and within the working region the metal particles 16 are processed to form the metal deposit. Outside the working region the liquid carrier medium 12 continues to flow across the substrate 10 and deliver metal particles 16 to the working region.

The liquid carrier medium 12 may be selected such that it controls a cooling rate of the submerged melt pool in a predetermined manner so as to optimize the structure of the resulting metal deposit. For example, the liquid carrier medium 12 could be thermally insulative such that cooling of the deposit is largely accomplished by conduction of heat to the underlying substrate. Such uniaxial cooling could promote directional solidification and associated grain structure. It may also be selected to be or to include other constituents to perform a fluxing function, such as cleaning the melt pool of impurities etc. For example, in electric arc furnace practice, after melt-in of the charge, lime (CaO) is introduced to provide a slag that will reduce the sulfur level of the melt. Accordingly, CaO is one example of such a cleansing constituent. In such an exemplary embodiment, any slag formed may float away with the liquid carrier medium 12.

Non limiting examples of suitable materials for the liquid carrier medium 12 include optical materials, molten salts, sodium potassium (NaK—liquid from −12.6° C. to 785° C.), and water. Non limiting examples of optical materials include:

CdTe (m.p.=1092° C.; transmittance @ room temperature to 1.06μ=58%);

Ge (m.p.=937° C.; trans. @ r.t. to 1.06μ=15%);

BK7 Schott Glass (m.p.=559° C.; trans. @ r.t. to 1.06μ=92%);

LiF (m.p.=870° C.; trans. @ r.t. to 1.06μ=93%);

MgF$_2$ (m.p.=1255° C.; trans. @ r.t. to 1.06μ=97%);
KBr (m.p.=728° C.; trans. @ r.t. to 1.06μ=93%);
TlBr—TlI—Thallium Bronoiodide (m.p.=414.5° C.; trans. @ r.t. to 1.06μ=72%);
ZnSe (m.p.=n.a.; trans. @ r.t. to 1.06μ=62%);
ZnS (m.p.=n.a.; trans. @ r.t. to 1.06μ=66%);
NaCl (m.p.=801° C.; trans. from 0.4μ to 10μ>90%); and
KCl (m.p.=776° C.; trans. from 0.4μ to 10μ>90%).

The metal particles 16 may range in size from approximately 20 microns to several millimeters. In a non-limiting exemplary embodiment the metal particles 16 may be a nickel based alloy or a nickel based super alloy and may be the same or different as a composition of the substrate 10. The metal particles 16 may be coated with a coating material that is less soluble in the liquid carrier medium 12 than a material of the metal particles 16. The metal particles 16 may be coated with a coating material that absorbs energy from the first laser beam 30 more readily than a material of the metal particles 16. The metal particles 16 may be coated with a coating material that acts as a fluxing agent in the melt pool. An example of a highly absorptive coating material is graphite. Coatings acting as fluxing agents could be oxides such as alumina, silica, or calcia, or fluorides such as calcium, sodium, or lithium fluoride.

Figure 2:
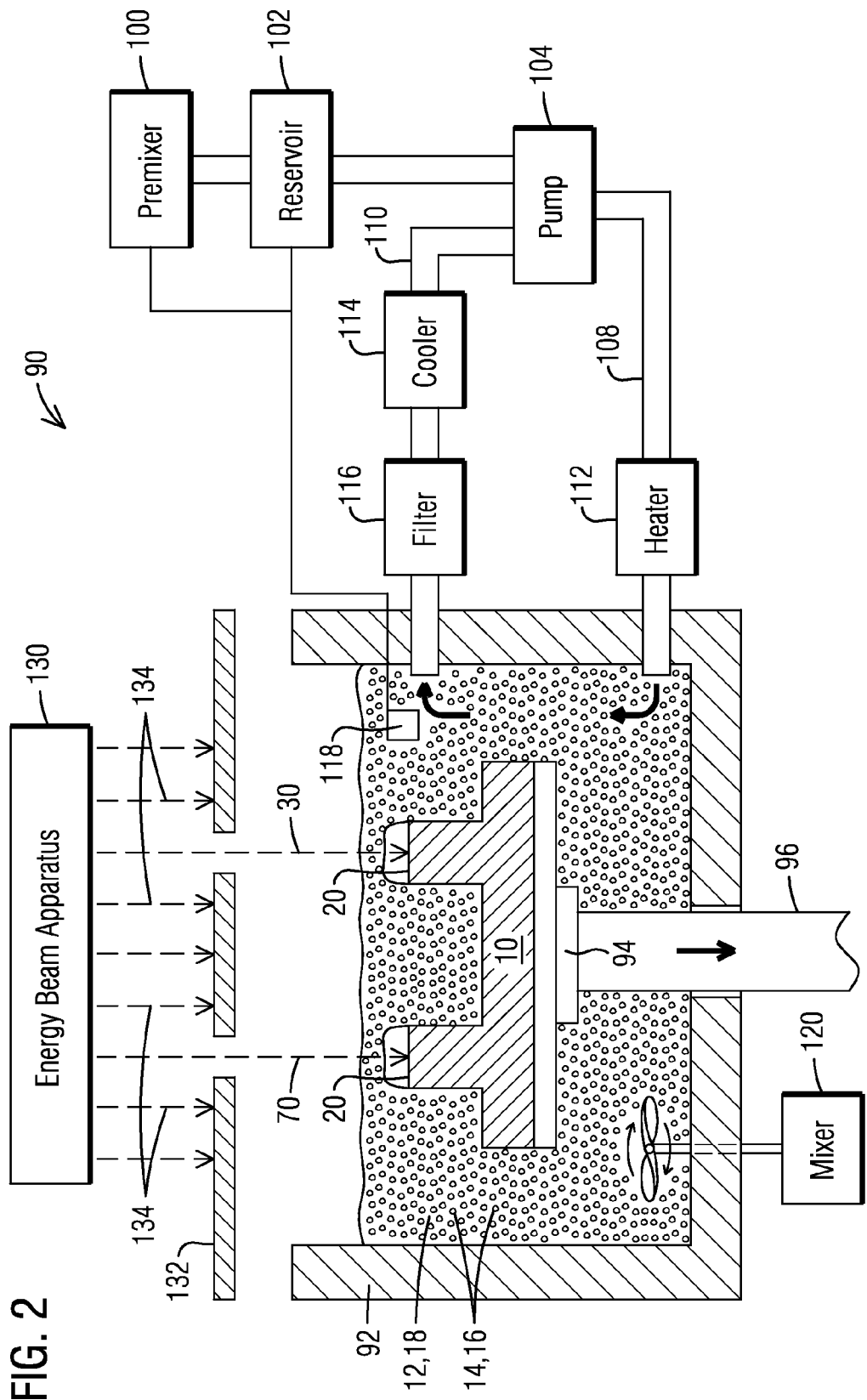
FIG. 2 is a schematic illustration of an alternate exemplary embodiment of the additive manufacturing process.

FIG. 2 schematically illustrates a process apparatus 90 having a chamber 92 configured to contain the liquid carrier medium 12 and deliver a flow of the liquid carrier medium 12 across the substrate surface 20. The substrate 10 sits on a platform 94 that can be moved up and/or down as desired via a shaft 96. The liquid carrier medium 12 may be created in a liquid carrier medium premixer 100, delivered to a liquid carrier medium reservoir 102, and circulated to and from the chamber 92 via a recirculating pump 104. The recirculating pump 104 may be in fluid communication with the chamber 92 via a delivery conduit 108 and a return conduit 110. A heater 112 may be used to heat the liquid carrier medium 12. A cooler 114 may be used to cool the liquid carrier medium 12 if it becomes over heated. A filter 116 may be used to filter the liquid carrier medium 12, and a mixer 120 may be used to mix the liquid carrier medium 12 and keep the metal particles 16 in suspension. A sensor 118 may be used to monitor the concentration of metal particles 16 and provide feedback to the liquid carrier medium premixer 100 and the liquid carrier medium reservoir 102 to make changes to maintain concentration or, if desired, to increase or decrease concentration.

In the exemplary embodiment shown, an energy beam apparatus 130 is used to generate the first laser beam 30 and the second laser beam 70. The two laser beams may be separately created within the energy beam apparatus 130, or an optional mask 132 may be placed between the energy beam apparatus 130 and the substrate 10 to block any unwanted laser energy 134. The energy beam apparatus 130 may be, for example, a diode laser, a scanning device from a disk or fiber laser source, or any other suitable type of energy beam forming apparatus suitable for SLS or SLM processes.

Figure 3:
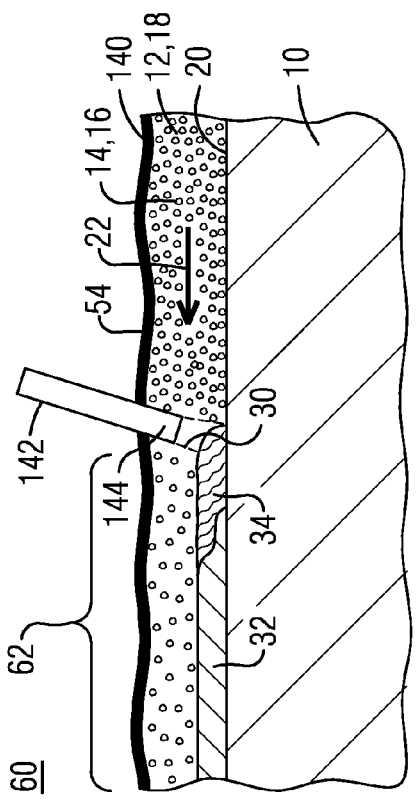
FIG. 3 is a schematic illustration of an alternate exemplary embodiment of the additive manufacturing process.

FIG. 3 schematically illustrates an alternate exemplary embodiment of the additive manufacturing process disclosed herein, where the liquid carrier medium 12 is characterized by an opaque layer 140 at the liquid carrier medium surface 54. The opaque layer 140 may form when the liquid carrier medium 12 interacts with the atmosphere 60 overlying the liquid carrier medium 12. Under the opaque layer 140 the liquid carrier medium 12 may remain relatively transmissive to the first laser beam 30. In such an exemplary embodiment, an optical tool 142 may be used. A submerged end 144 of the optical tool 142 may be positioned below the opaque layer 140 and used to deliver the first laser beam 30 under the opaque layer 140 to the substrate surface 20. The optical tool 142 may be a hollow refractory metal (e.g. tungsten, molybdenum, tantalum etc.) tool that conducts laser light there through. Alternately, the optical tool 142 may have an optically transmissive core. Still alternately it is possible that such optical tool may not be needed. That is, the laser energy could locally volatilize the opaque layer thereby providing a clear path for laser energy to reach the underlying suspension or colloidal suspension 18 and process effectively on the substrate 10.

Should the arrangement of FIG. 3 be deemed undesirable, instead of using the optical tool 142, the atmosphere 60 may be selected to include a chemical composition that is compatible with the liquid carrier medium 12 and therefore does not create the opaque layer 140. A vacuum or inert atmospheres such as argon or helium may be of particular advantage in avoiding such opaque layer 140. Alternately, a gas such as argon, that is heavier than air, could be used as a layer of inert gas between the atmosphere 60 and the liquid carrier medium surface 54 to protect the liquid carrier medium surface 54.

Figure 4:
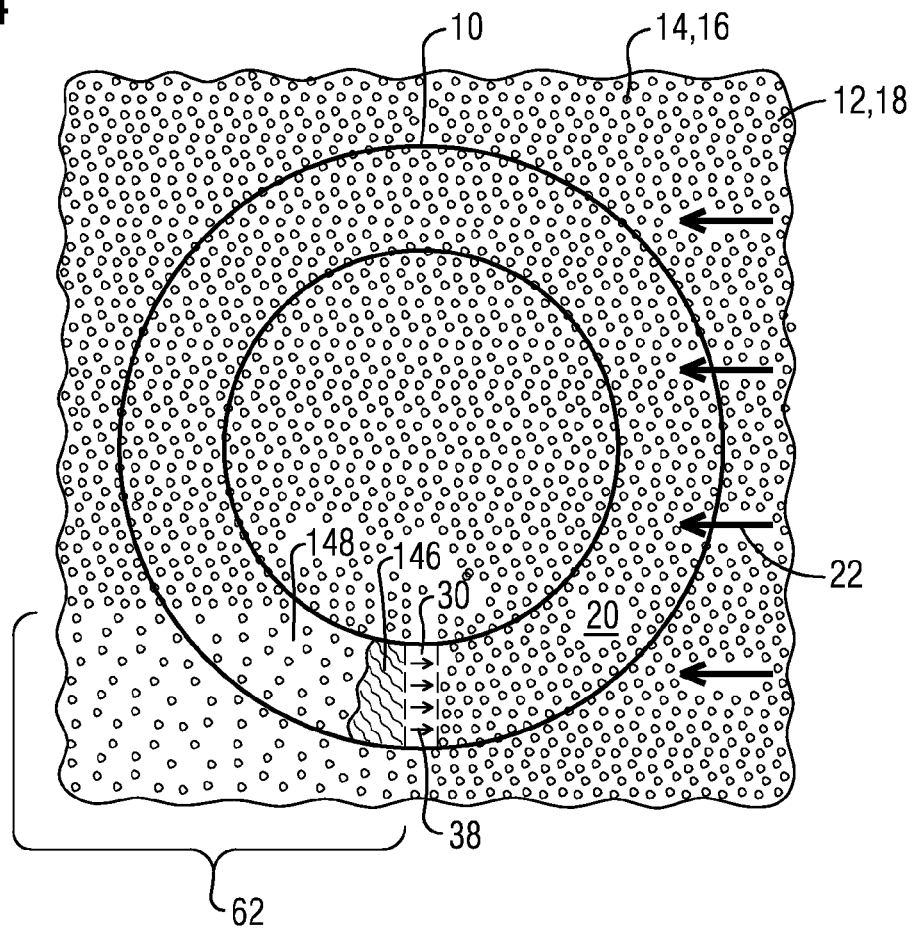
FIGS. 4-5 are schematic illustrations of an alternate exemplary embodiment of the additive manufacturing process.
Figure 5:
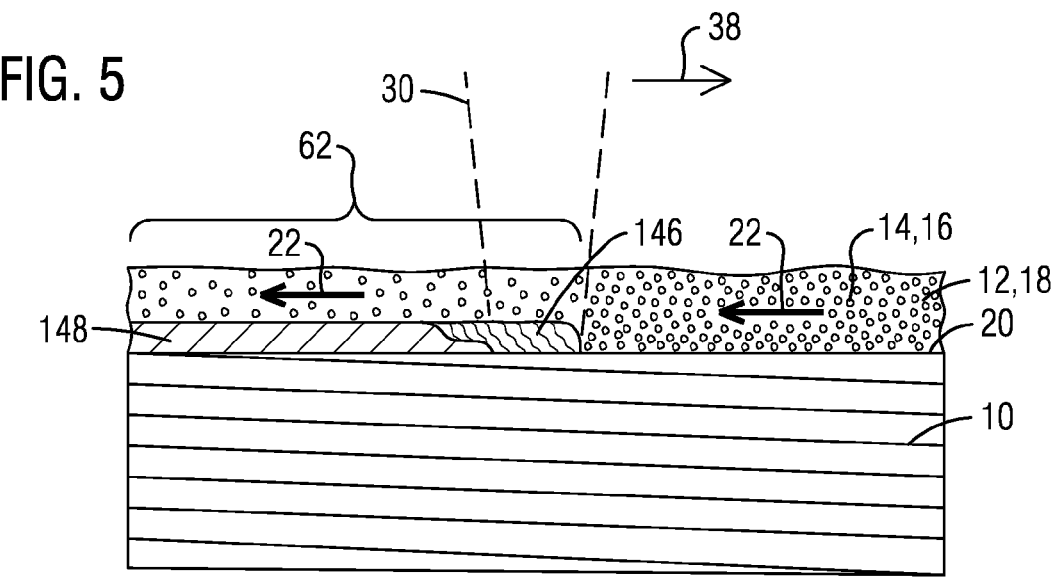

FIGS. 4 and 5 schematically depict the additive manufacturing process where the laser process is able to continue moving the melt pool 146 nonstop from initiation to completion of the component. The substrate 10 shown is cylindrical in shape and has an inclined substrate surface 20. This permits the metal deposit 148 to be continuously formed as a helix, such that as the first laser beam 30 traverses the substrate 10 is continuously lowered. Other deposit shapes may be used and a traversal rate of the first laser beam 30 may be varied to vary a thickness of the metallic deposit 148. For example, instead of forming a constant helical shape, the laser beam could start a metallic deposit 148 and traverse the substrate surface 20 along a path until it works its way to the beginning of the metallic deposit 148. The first laser beam 30 could simply continue traversing over the step at the beginning of the metallic deposit 148 and continue. The resulting metallic deposit 148 would be continuous, with a step up each time it traversed over the beginning of the metallic deposit 148. A step could also be avoided all together by ramping the thickness at the initiation of the deposit. Any combination of the above teachings may be used to complete the component in as few as zero interruptions to the laser processing.

It should be evident that the suspension or colloidal suspension 18 provides a very thorough coverage of the substrate 10 during all processing. That is, even in the trail of processing where the metal deposit may be solidified but still hot and potentially reactive if exposed to atmosphere, the suspension is completely blanketing the still-hot metal deposit. Similarly, if preheated, the suspension or colloidal suspension 18 provides a pre-warming of the substrate 10 and slows the rate of cooling from the sintering or melting temperatures achieved at the point/area of processing.

From the foregoing it can be seen that the inventors have devised an innovative method for additive manufacturing that eliminates steps that require costly equipment and slowed production rates by replacing them with a unique material delivery method. The method disclosed herein permits continuous buildup of substrate material, which reduces cycle time and associated costs. Furthermore, the use of the liquid carrier medium may represent an improvement in safety, since its presence is more readily detectable when compared to an invisible shielding gas used in the prior art. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method, comprising:
flowing a liquid carrier medium comprising a supply of metal particles across a surface of a substrate;
directing an energy beam through the flowing liquid carrier medium toward the surface; and
heating at least some of the metal particles in the liquid carrier medium with the energy beam to form a metallic deposit that is bonded to the substrate surface and that is covered by the liquid carrier medium.

2. The method of claim 1, wherein the liquid carrier medium and the supply of metal particles form a colloidal suspension.

3. The method of claim 1, wherein the heating step further comprises forming a metallic deposit that is porous and comprises sintered metal particles.

4. The method of claim 1, wherein the heating step further comprises forming a molten pool comprising the metal particles, and cooling the molten pool into the metallic deposit.

5. The method of claim 1, further comprising raising or lowering the substrate while simultaneously forming the metallic deposit.

6. The method of claim 1, wherein the metal particles are suspended in the liquid carrier medium and the method further comprises agitating the liquid carrier medium so the metal particles remain suspended.

7. The method of claim 1, further comprising submerging an end of an optical conduit in the liquid carrier medium and directing the energy beam out of the submerged end of the optical conduit and toward the surface to heat the at least some of the metal particles.

8. The method of claim 1, wherein the liquid carrier medium further comprises a fluxing agent.

9. The method of claim 1, wherein the metal particles are coated with a coating material that is less soluble in the liquid carrier medium than a material of the metal particles.

10. The method of claim 1, wherein the metal particles are coated with a coating material that absorbs energy from the energy beam more readily than a material of the metal particles.

11. The method of claim 1, wherein the liquid carrier medium is characterized by a boiling temperature above a melting temperature of the metal particles.

12. The method of claim 1, further comprising heating at least one of the substrate and the liquid carrier medium enough to maintain the liquid carrier medium in a liquid state.

13. The method of claim 1, wherein the liquid carrier medium is selected from a group consisting of: fluorides, NaK, CdTe, Ge, crown glass, LiF, MgF2, KBr, TlBr-TlI, ZnSe, ZnS, NaCL, KCL, and other salts.

14. The method of claim 1, wherein the metal particles comprise a nickel-based alloy or superalloy.

15. A method, comprising:
(a) immersing a substrate within a liquid carrier medium circulating across the substrate, the liquid carrier medium comprising a supply of metal particles;
(b) heating at least some of the metal particles through the circulating liquid carrier medium with at least one energy beam to form a melt pool comprising melted metal particles disposed on a surface of the substrate and immersed in the circulating liquid carrier medium; and
(c) cooling the melt pool within the circulating liquid carrier medium to form a metallic deposit bonded to the substrate and immersed in the circulating liquid carrier medium.

16. The method of claim 15, further comprising raising or lowering the substrate while performing step (b).

17. The method of claim 15, further comprising at least one of:
at least periodically replenishing the supply of metal particles;
agitating the liquid carrier medium so the metal particles remain suspended in the liquid carrier medium;
heating at least one of the liquid carrier medium and the substrate to keep the liquid carrier medium in a liquid state; and
cooling overheated liquid carrier medium.

18. A method, comprising:
sheeting a mixture comprising a supply of suspended metal particles in a liquid carrier medium flowing across a surface of a substrate;
heating at least some of the metal particles with an energy beam through the flowing mixture to form a metallic deposit on the surface of the substrate that is covered by the liquid carrier medium.

19. The method of claim 18, further comprising controlling the heating to form a metallic deposit that is porous and comprises sintered metal particles.

20. The method of claim 18, further comprising controlling the heating to form a molten pool comprising the heated metal particles, and cooling the molten pool to form the metallic deposit.

* * * * *